Patented June 6, 1933

1,913,052

UNITED STATES PATENT OFFICE

ALPHONS O. JAEGER AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF PERYLENE TETRACARBOXYLIC ACID IMIDE COMPOUNDS

No Drawing.    Application filed January 12, 1929.   Serial No. 332,231.

This invention relates to the purification of vat dyes and intermediates and more particularly to the purification of dyes and intermediates of the perylene tetracarboxylic acid type.

The important red Bordeaux dye and its derivatives which are prepared by the alkali fusion of naphthalimides and which is the perylene tetracarboxylic acid di-imide, is ordinarily obtained contaminated by a considerable amount of impurities which may in some cases amount to 50% of the total product. These impurities are difficult to remove and seriously affect the brightness and strength of the dye and of its alkylated derivatives. The problem of purifying these important dyes forms the principal object of the present invention.

According to the present invention the crude dye is hydrolyzed to the corresponding acid, neutralized, separated and then subjected to the treatment with an oxidizing agent, preferably chlorine in the presence of excess alkali. The hypochlorite formed in the nascent state destroys the colored impurities or renders them easily separable. The treatment is preferably carried out at or above 50° C. After separation the product can then be imidized by heating with ammonia after regenerating the acid, or, if it is desired to produce an alkyl derivative, the imidization may take place with an alkyl amine instead of ammonia, for example with methyl amine, when the bright red methylated dye is desired. Instead of using an alkyl amine, a mixture may be used which generates the amine in a nascent state. In a similar way, other alkyl amines may be used, such as, ethyl, propyl, butyl, and the like, or alicyclic amines, such as cyclohexyl amine and its homologues. Aralkyl amines, such as benzylamine may also be used effectively. In fact the process may be used generally with any suitable amino compound.

Instead of using nascent hypochlorite, preformed hypochlorite may be used, but is normally less desirable as it is more expensive and less convenient and active. Other oxidizing agents, such as permanganates, persulphates and peroxides may be used.

A further purification may be effected by recrystallization of the salt of the perylene tetracarboxylic acid. This is very effective in some cases and may be advantageously combined with the oxidation treatment. When the salt is recrystallized, it is frequently desirable to add adsorptive materials to the solution, such as, for example, activated carbon, silica gel, and the like. It is sometimes further desirable to subject the purified perylene tetracarboxylic acid after it has been precipitated out to further oxidation in alkaline, neutral or slightly acid solutions, for example, by means of permanganates, persulphates, peroxides, or other suitable oxidizing agents.

The invention is applicable also to the purification of substituted perylene tetracarboxylic acid di-imido compounds, for example, haolgen- or nitro-substituted compounds. It is an advantage of the present invention that not only can the perylene dye be purified in a simple and effective manner producing dyes of great brilliancy and strength but where the alkylated or similar substituted dyes are required, they may be formed during the purification without an additional step and the process presents important economies. There is no serious problem from apparatus corrosion, which is an added advantage of the present invention and which permits the use of relatively cheap apparatus with comparatively small losses from depreciation.

It should be noted that the perylene tetracarboxylic acid compound is present in the form of its alkali metal salts during the purification by oxidation and these salts are relatively stable against destruction by oxidation, which constitutes an advantage of the present invention since the losses of material are reduced to a minimum.

A further advantage of the present invention lies in the fact that part of the impurities of the original imide dye consist in compounds of perylene tetracarboxylic acid or of the monoimide. These compounds in the oxidation treatment are, of course, not destroyed but are transformed into the perylene tetracarboxylic acid salts or remain in this form so that frequently the amount of purified perylene tetracarboxylic acid salt is greater than the amount of the dye in the crude fusion product. The transformation of some of the impurities into compounds which when imidized yield further quantities of good dye is an important economic advantage of the present process.

The invention will be described in greater detail in connection with the following examples which illustrate a few typical modifications without limiting the invention to the details therein set forth.

Example 1

The reaction mixture from the fusion of naphthalimide with caustic potash is dissolved in water, filtered and washed with water until the wash water begins to be more heavily colored. The product is dried and then dissolved in 12 parts by weight of sulfuric acid of a concentration between 93 and 100%, the solution being heated to 180–200° C. for 15 to 20 minutes. The sulfuric acid solution is then cooled to 50° C. or lower and slowly run into 2 parts by weight of water with vigorous agitation and cooling so that the temperature is prevented from rising above 120° C. The diluted solution is cooled to 50° C. or lower and blown slowly into a large volume of water which is kept nearly boiling with vigorous agitation in a lead-lined tank.

The precipitate which forms is filtered off, washed with water until almost free from acid and then stirred up in an iron vessel with water containing from .01 to .02 parts of caustic soda. Enough water is added to make a thin mobile slurry. Measured quantities of a 10–15% caustic soda solution are then added in small portions, stirring the mixture after each addition for a few moments, a test being made for free alkali with litmus paper. The treatment is continued until permanent alkalinity results and a 15–20% excess of caustic over that required for neutralizing the presscake is added in a single portion.

The alkaline mixture is warmed to 38–42° C. and a slow stream of chlorine is run in with rapid agitation until the free caustic soda is nearly neutralized. The amount of chlorine may be determined by calculation from the amount of free caustic added or by testing the solution from time to time with litmus paper until the paper is bleached so quickly that it does not show any indication of alkali before it is bleached. The combination of the two methods is very effective and gives a most accurate control.

During the introduction of the chlorine, cooling should be provided, if necessary, to prevent the temperature of the batch rising above 50° C. After all of the chlorine has been added, the temperature of the batch is slowly raised to 70° C. in the course of 1½ to 2 hours, the mixture being tested from time to time with starch-potassium iodide test paper for the presence of hypochlorite. When hypochlorite is no longer present, the operation is complete but if the hypochlorite is used up too rapidly, that is to say in less than ½ hour, which however rarely occurs, the purification may be incomplete and a further treatment with hypochlorite may be needed. On the other hand, if the hypochlorite is not destroyed in a half hour after reaching a temperature of 70° C., the excess may be destroyed by adding small amounts of ammonia. The completeness of the purification may be determined by letting a test sample settle and looking at a brightly illuminated white object through a thin layer of the supernatant liquor. When compared with a control from a fully purified batch the liquor will be clear, bright red if completely purified but a dull brown red if the purification is incomplete. If the test shows incomplete purification, the batch is cooled to 40° C., some more of the 10–15% caustic soda solution is added, using about half as much as originally used for free alkali or even less if the test shows the purification to be almost complete, and the chlorine treatment is repeated.

After the purification is complete and the excess oxidizing agent, if any, is destroyed, the batch is run into a hot 5–8% solution of sulfuric or other strong mineral acid in a lead-lined tank provided with a good agitator, the amount of acid being from 5–10% in excess to the amount of alkali used for neutralizing the presscake. The mixture is heated to boiling with agitation, filtered, and washed with hot water until the water is free from sodium sulfate. The cake is then transferred to an iron ball mill which may advantageously rotate through part of its course in an oil or metal bath, or is provided with other means to control heat. Concentrated ammonia is added in an amount about double that required for reconversion of all the perylene tetracarboxylic acid back to the di-imide, figuring the amount of perylene tetracarboxylic acid on the basis of the total amount of naphthalimide originally fused. Thus, for instance, if 26 Bé. ammonia is used, about 0.6 part by weight should be used for each part of naphthalimide in the original dye fusion. During warming the vapor outlet of the ball mill should be open and the ball mill kept running until the batch is completely dry, then about 4 to 10 pound back pressure is put on the ball mill and it is slowly heated to 250–300° C. while grinding the product and passing a very slow stream of ammonia gas through the mill. The back pressure may advantageously be obtained by suitable regulator valve on vapor outlet. The operation should be continued until a test sample when ground with 100 parts of water containing .01 part of potassium hydroxide and heated to boiling gives an almost colorless filtrate on hot filtration. If the product is to be used as a powder, it is ready on cooling the ball mill and dumping it; but if it is to be used in the form of a paste or suspended in water, steam may be introduced into the ball mill when the latter has cooled to 100–105° C. and the cooling continued in the atmosphere of steam with continued grinding until sufficient steam is condensed to form a paste of satisfactory concentration containing, for example, about 3 parts of water to 1 part of solid.

*Example 2*

The procedure of Example 1 is carried out up to the point of introducing the purified perylene tetracarboxylic acid into the ball mill, but instead of using ammonia a solution of methylamine of equivalent strength is used in the same way as described in Example 1 and methylamine gas is passed through during the final heating step instead of ammonia. The product is isolated in either of the forms described in Example 1, and constitutes the methylated imide, which is a bright red dye.

*Example 3*

The procedure of the first two examples is followed down to the isolation of the perylene tertacarboxylic acid filter cake. The cake is dried and refluxed for two hours with 2.5 parts of aniline in an oil-jacketed still provided with an agitator. The excess of aniline is distilled off and the dye remaining in the still is heated for two hours with a jacket temperature of 280–300° C. The still is then cooled and, if desired to obtain a paste, steam may be introduced and permitted to condense, as described in the foregoing examples.

*Example 4*

The procedure of Example 1 is repeated up to the point where the excess alkali for the hypochlorite formation is added. The neutralized perylene tetracarboxylic acid suspension is heated to 70–80° C. and a preformed sodium hypochlorite solution is slowly added, which solution may be prepared from 3–10% caustic soda solution and contain only sufficient excess alkali (1–3% of the amount used in its preparation) to stabilize it. The temperature of the batch is maintained by heating during introduction of the hypochlorite and the latter is run in only fast enough to maintain a definite but not a strong test with starch-potassium iodide paper. When a pronounced lag in the disappearance of the hypochlorite begins to appear, the addition is stopped and the subsequent treatment is continued as in the foregoing three examples.

It should be noted that the procedure of the present invention in its preferred embodiments as described in the specific examples presents several operating advantages:

1. By limiting the washing of the fusion product, any perylene tetracarboxylic acid or monoimide formed by hydrolytic side reactions in the fusion are conserved and eventually recovered as the di-imide dye, since the alkali metal salts of these acids show a very low solubility, especially in the presence of other alkali metal compounds.

2. By using the two-stage dilution, the initial stage may be carried out in iron equipment without corrosion difficulties and the second stage may be carried out at high temperatures which result in a hydrolytic product, which is more readily filtered.

3. The temperature limits used in the preparation of the hypochlorite in the first three examples bring about the most satisfactory balance between the two decomposition reactions of the hypochlorite, namely its decomposition to chloride and nascent oxygen, which is used in the purification, and its decomposition to chloride and chlorate, where the oxidizing activity is lost.

4. The reconversion of the perylene tetracarboxylic acid to the dye is accomplished under conditions which not only insure complete conversion but permit recovering the product in either of the most desirable forms for commercial sale or subsequent treatment.

It should be understood that while the above advantages of the preferred method of carrying out the invention are of great importance, the invention in its broader scope is in no sense limited thereto but other modifications of procedure may be used.

What is claimed as new is:

1. A method of purifying a perylene tetracarboxylic acid imide compound containing easily oxidizable impurities, which comprises transforming the crude compound into a salt of the corresponding perylene tetracarboxylic acid, subjecting said salt to a purification treatment, transforming the salt into the acid and effecting imidization.

2. A method of purifying perylene tetracarboxylic acid imide compounds containing easily oxidizable impurities, which comprises transforming the compound into an alkali forming metal salt, subjecting the mixture thus obtained to selective oxidation of the impurities with an oxidizing agent capable of oxidizing impurities but insufficent to substantially oxidize the perylene tetracarboxylic acid salts, regenerating the perylene tetracarboxylic acid and effecting imidization.

3. A method of purifying perylene tetracarboxylic acid imide compounds, which comprises transforming the compound into an alkali forming metal salt, subjecting the mixture thus obtained to oxidation by means of a hypohalite, regenerating the perylene tetracarboxylic acid and effecting imidization.

4. A method of purifying perylene tetracarboxylic acid imide compounds, which comprises transforming the compound into an alkali forming metal salt, subjecting the mixture thus obtained to oxidation by means of a hypochlorite, regenerating the perylene tetracarboxylic acid and effecting imidization.

5. A method of purifying perylene tetracarboxylic acid imide compounds, which comprises subjecting the crude compounds to hydrolysis to transform it into the corresponding alkali forming metal salt, providing an excess of alkali, introducing chlorine until the impurities have been sufficiently oxidized, regenerating the acid and separating it from the impurities and then subjecting it to imidization.

6. A method of transforming a crude perylene tetracarboxylic acid imide substance into a purified perylene tetracarboxylic acid imide substance in which at least one imide group contains an organic radical in the place of hydrogen, which comprises transforming the crude perylene tetracarboxylic acid imide substance into the corresponding alkali forming metal salt of the corresponding perylene tetracarboxylic acid, subjecting the product to selective oxidation of the impurities with an oxidizing agent capable of oxidizing impurities but insufficient to substantially oxidize the perylene tetracarboxylic acid salts, regenerating the acid and transforming the acid into the substituted imide substance by causing it to react with a monoamine.

7. A method of preparing perylene tetracarboxylic acid methyl imide according to claim 6 in which the amine is methyl amine.

8. A method of purifying perylene tetracarboxylic acid imide compounds prepared by caustic alkali fusion methods and containing among the impurities perylene tetracarboxylic acid compounds which are not dyes, which comprises subjecting the fusion to washing with an amount of water insufficient to notably dissolve perylene tetracarboxylic acid salts, transforming all of the perylene tetracarboxylic acid compounds present into salts, subjecting the salts to a purification treatment, transforming the salts into the corresponding acids, and effecting imidization.

9. A method of purifying perylene tetracarboxylic acid imide compounds prepared by caustic alkali fusion methods and containing among the impurities perylene tetracarboxylic acid compounds which are not dyes, which comprises subjecting the fusion to washing with an amount of water insufficient to notably dissolve perylene tetracarboxylic acid salts, transforming all of the perylene tetracarboxylic acid compounds present into salts, subjecting the mixture thus obtained to selective oxidation of the impurities with an oxidizing agent capable of oxidizing impurities but insufficient to substantially oxidize the perylene tetracarboxylic acid salts, transforming the salts into the corresponding acids, and effecting imidization.

10. A method of purifying perylene tetracarboxylic acid imide compounds prepared by caustic alkali fusion methods and containing among the impurities perylene tetracarboxylic acid compounds which are not dyes, which comprises subjecting the fusion to washing with an amount of water insufficient to notably dissolve perylene tetracarboxylic acid salts, transforming all of the perylene tetracarboxylic acid compounds present into salts, subjecting the mixture thus obtained to oxidation by means of a hypohalite, transforming the salts into the corresponding acids, and effecting imidization.

11. A method of purifying a perylene tetracarboxylic acid imide compound containing easily oxidizable impurities, which comprises hydrolyzing the compound with strong sulfuric acid at an elevated temperature, cooling, diluting with an amount of water insufficient to produce a sulfuric acid sufficiently dilute to attack iron apparatus, cooling after dilution and introducing the cooled dilute solution into a large quantity of water, adding sufficient alkali to form the corresponding alkali metal salts, purifying by means of oxidation, regenerating the perylene tetracarboxylic acid and effecting imidization.

12. A method according to claim 1, in which the imidization takes place in an atmosphere of the amine compounds used.

13. A method according to claim 1, in which the imidization takes place in a grinding mill under the atmosphere of the amine compound and at a temperature which removes water.

14. A method according to claim 1, in which the imidization takes place in a grinding mill under the atmosphere of the amine compound and at a temperature which removes water, followed by the introduction of steam and cooling to effect sufficient condensation to form a paste.

15. A method according to claim 1, in which the major portion of the perylene tetracarboxylic acid imide compound is a diimide.

16. A method according to claim 2 in which the major portion of the perylene tetracarboxylic acid imide compound is a diimide.

17. A method according to claim 3 in which the major portion of the perylene tetracarboxylic acid imide compound is a diimide.

18. A method according to claim 11 in which the major portion of the perylene tetracarboxylic acid imide compound is a diimide.

Signed at Pittsburgh, Pennsylvania, this 10th day of January, 1929.

ALPHONS O. JAEGER.
LLOYD C. DANIELS.